United States Patent [19]

Osaka et al.

[11] Patent Number: 5,384,878
[45] Date of Patent: Jan. 24, 1995

[54] METHOD FOR FUSION CONNECTING OPTICAL FIBERS UTILIZING V-GROOVES WITH NONCONDUCTING LAYER

[75] Inventors: Keiji Osaka; Toru Yanagi, both of Yokohama, Japan

[73] Assignee: Sumitomo Electric Industries, Ltd., Osaka, Japan

[21] Appl. No.: 866,454

[22] Filed: Apr. 10, 1992

[30] Foreign Application Priority Data

Apr. 12, 1991 [JP] Japan ................. 3-171584

[51] Int. Cl.⁶ ................................ G02B 6/26
[52] U.S. Cl. ........................ 385/96; 385/95; 385/97; 385/98
[58] Field of Search ............. 385/96, 95, 97, 98, 385/99; 219/121.11, 121.16, 125.1, 158, 161; 427/162, 163

[56] References Cited

U.S. PATENT DOCUMENTS

| | | | |
|---|---|---|---|
| 4,049,414 | 9/1977 | Smith | 385/96 X |
| 4,345,137 | 8/1982 | Mignien et al. | 385/97 X |
| 4,690,493 | 9/1987 | Khoe | 385/96 X |
| 4,725,297 | 2/1988 | Grigsby et al. | 385/96 X |
| 4,758,061 | 7/1988 | Horn | 385/98 X |
| 4,765,704 | 8/1988 | Pers | 385/97 X |
| 4,810,054 | 3/1989 | Shinbori et al. | 385/96 |
| 4,911,522 | 3/1990 | Iwamoto et al. | 385/97 X |
| 4,957,343 | 9/1990 | Sato et al. | 385/96 X |
| 5,011,259 | 4/1991 | Lieber et al. | 385/97 X |
| 5,218,184 | 6/1993 | Hakoun et al. | 219/383 |
| 5,222,172 | 6/1993 | Suzuki | 385/96 |

FOREIGN PATENT DOCUMENTS

| | | | |
|---|---|---|---|
| 0462893 | 12/1991 | European Pat. Off. | 385/96 X |
| 0379938 | 1/1992 | European Pat. Off. | 385/96 X |
| 58-50507 | 3/1983 | Japan | 385/96 X |
| 1-046708 | 2/1989 | Japan | 385/96 X |
| 2-087106 | 3/1990 | Japan | 385/96 X |

OTHER PUBLICATIONS

Matsumoto et al., "Design and characteristics of . . . Optical Fiber" J. of Lightwave Tech., vol. Lt-3, No. 2 Apr. 1985 pp. 322-327.
"Fusion Splicing Characteristics of Hermetically Carbon Coated Fiber", Osaka et al., Yokohama Research labs. (No date available).

Primary Examiner—Brian Healy
Attorney, Agent, or Firm—Cushman Darby & Cushman

[57] ABSTRACT

Connection of hermetic optical fibers having a hermetic layer coated on optical fiber glass prepared by positioning the optical fibers on respective electrically nonconductive V-shaped grooves, aligning cores of the optical fibers and fusing and connecting the optical fibers through an aerial discharge gives a small break strength decrease after connection without removing the hermetic layer.

3 Claims, 2 Drawing Sheets

METHOD FOR FUSION CONNECTING OPTICAL FIBERS UTILIZING V-GROOVES WITH NONCONDUCTING LAYER

BACKGROUND OF THE INVENTION

1. Field of the Invention

The present invention relates to a method for fusing and connecting so-called hermetic optical fibers which have a thin film coating layer of, for example, a metal or carbon on a surface of an optical fiber glass.

2. Description of Related Art

Hitherto, a method for fusing and connecting optical fibers by an aerial discharge heat is used to permanently connect the optical fibers. The reasons therefor are that (1) a connection loss is small, (2) excellent reliability for a long term is obtained because the connected part is reinforced with a heat-shrink tube and the like after the connection.

A hermetic optical fiber has (1) improved water resistance and (2) improved reliability for a long term by coating a thin film of a metal, carbon or the like on an optical fiber surface. Since the surface of the hermetic optical fiber is electrically conductive, the strength after the connection is decreased. The reason therefor has been thought that the hermetic layer material is incorporated in the fused and connected part of the optical fiber.

In order to solve this problem, we proposed a method for connecting carbon hermetic optical fibers, which comprises removing a carbon layer immediately before setting the fibers on a fusing instrument, and fusing and connecting the hermetic optical fibers through an aerial discharge (Japanese Patent Kokai Publication No. 195304/1990 (Japanese Patent Application No. 14638/1989)).

A sample connected by this method and a sample fused and connected without removal of the hermetic layer were subjected to a break strength test. The results of the break strength are shown in Table and FIG. 3. The sample prepared by removing the carbon layer and fusing and connecting the optical fibers has the average break strength of almost twice that of the sample without removing the carbon layer. Characteristically, the breakage always occurred on a V-shaped groove made of a metal.

SUMMARY OF THE INVENTION

An object of the present invention is to provide a method for connecting hermetic optical fibers without removing a hermetic layer, which method forms a high strength connection between the hermetic optical fibers.

This and other objects of the present invention are achieved by a method for connecting hermetic optical fibers having a hermetic layer coated on optical fiber glass, which comprises positioning the optical fibers on respective electrically nonconductive V-shaped grooves, aligning cores of the optical fibers and fusing and connecting the optical fibers through an aerial discharge.

DETAILED DESCRIPTION OF THE INVENTION

Figure 1A:
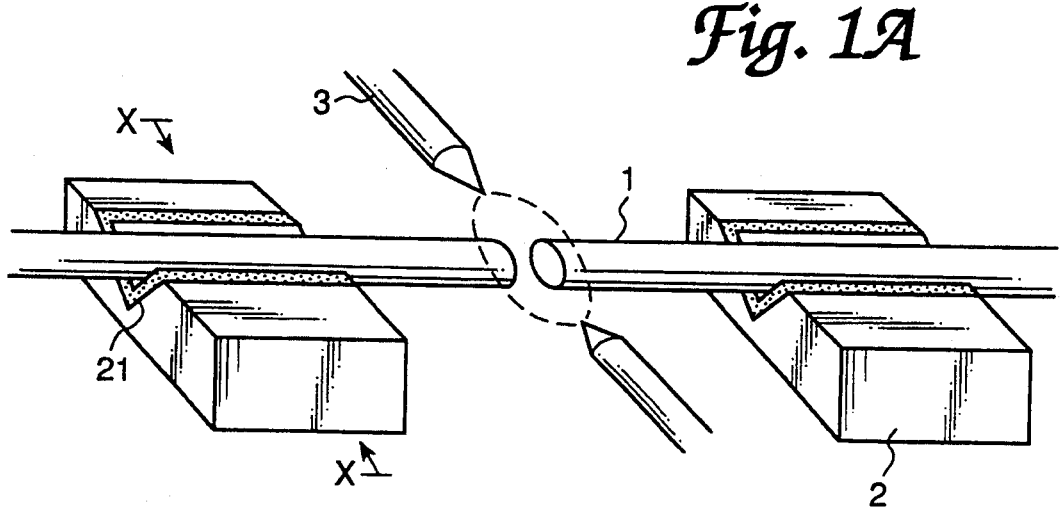
FIG. 1A is a perspective view of an embodiment of a method according to the present invention.
Figure 1B:
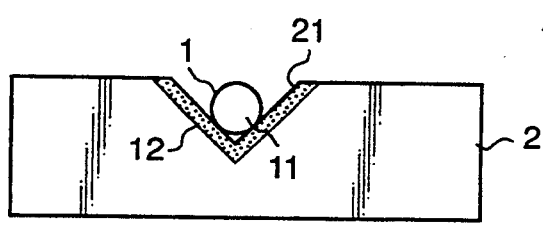
FIG. 1B is a cross-sectional view along the X—X line of FIG. 1A.

FIG. 1 shows an embodiment of the method according to the present invention. FIG. 1A is a perspective view as a whole and FIG. 1B is a cross-sectional view along the X—X line. A hermetic optical fiber 1 has a hermetic layer made of, for example, a metal and carbon, coated on the optical fiber glass surface. A pedestal 2 has a V-shaped groove 21 in a part made of an electrically nonconductive material which contacts with the optical fiber 1. The pedestal 2 may be made of an electrically nonconductive material as a whole. A pair of discharge electrodes 3 fuses the hermetic optical fibers by the aerial discharge heat.

As shown in the figure, the hermetic optical fibers are located on the electrically nonconductive V-shaped groove 21 of the pedestal 2 without removing the hermetic layer, the cores are aligned and then the optical fibers are fused and connected.

A nonconductive material forming the V-shaped groove has a resistivity of larger than $10^{+8}$ ohm.m and specific examples thereof are ceramics, glass, zirconia and alumina. A diameter of the hermetic optical fiber is usually from 5 to 1000, preferably from 50 to 300, more

TABLE

| No. | Steps | number of samples | Average value | Maximum value | Minimum value | Break number at V groove |
|---|---|---|---|---|---|---|
| 1 | coverage removal → cutting → fusion | 20 | 0.7 | 1.1 | 0.5 | 16 |
| 2 | coverage removal → cutting → carbon removal → fusion | 20 | 1.4 | 1.8 | 0.8 | 8 |

As stated above, the method for fusing and connecting the optical fibers after removing the carbon layer gives a connection having a slight decrease of strength. But, the removal of the carbon layer needs to remove the carbon layer through a thermal decomposition by heating the carbon layer to higher than 500° C., preferably 500° to 1,000° C. thereby requiring a labor and a time.

preferably from 120 to 130 μm. A thickness of the hermetic layer is usually from 100 to 1000 Å. The aerial discharge is conducted so that a fusion temperature is usually from 1000° to 2500° C., preferably from 1600° to 2000° C. Specific examples of the material hermetically coated on the fiber are nickel, copper, aluminum, gold, carbon, boron, titanium and magnesium.

PREFERRED EMBODIMENT OF THE INVENTION

The present invention will be illustrated by the following Example.

Example

Figure 2:
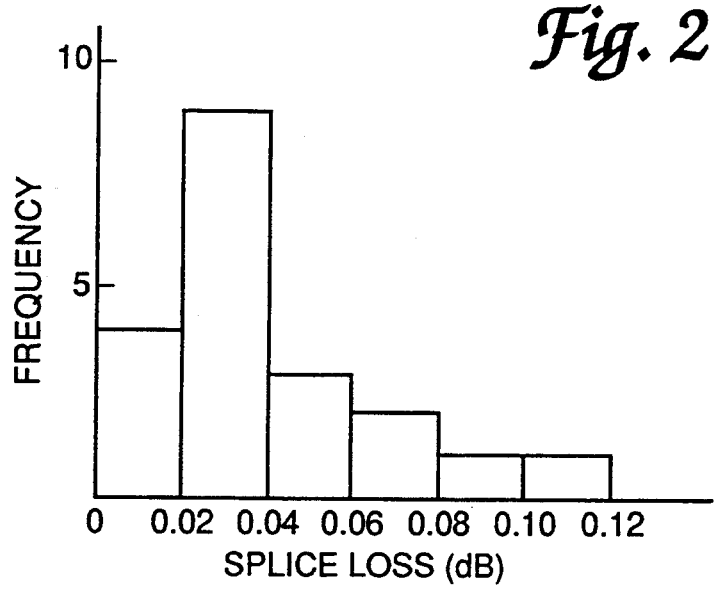
FIG. 2 shows a splice loss characteristic histogram of hermetic optical fibers connected according to the method of the present invention.
Figure 3:
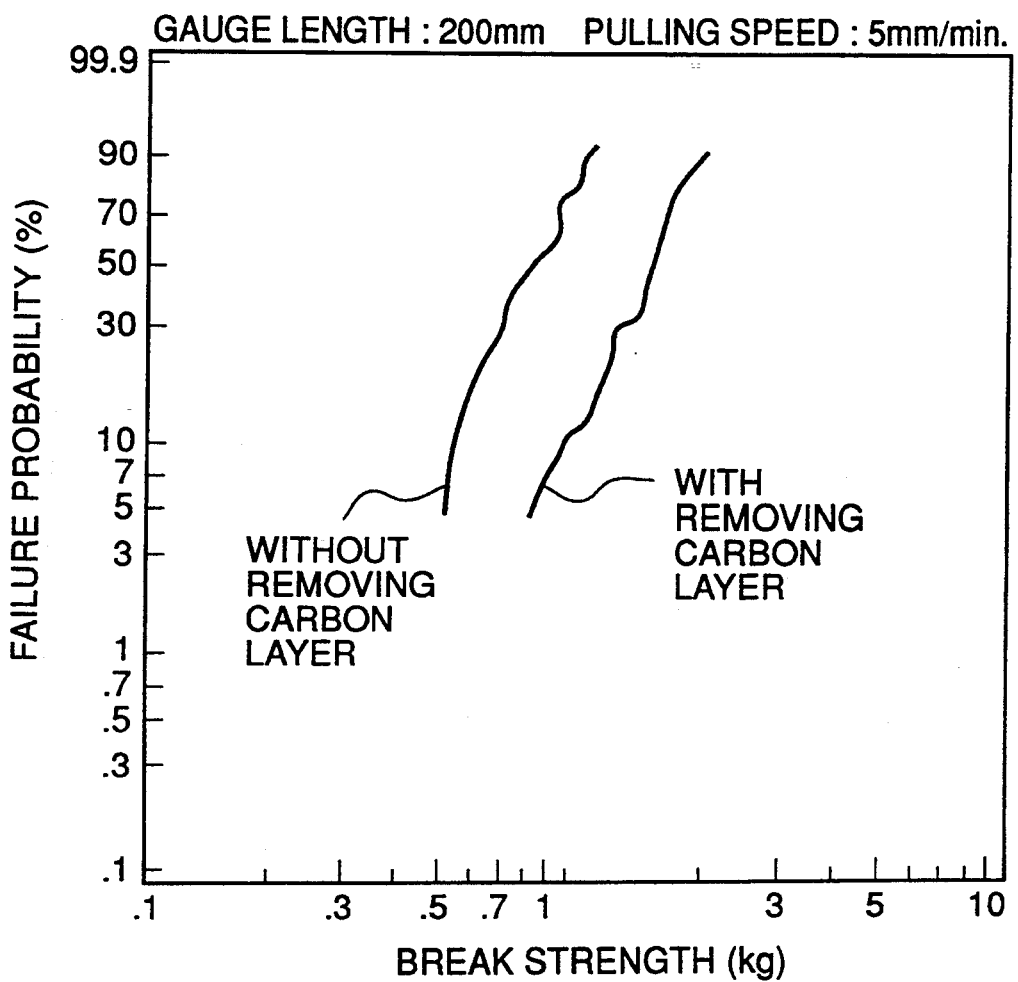
FIG. 3 shows the break strength of carbon coated hermetic optical fibers after splicing with and without removing a carbon layer according to conventional methods.
Figure 4:
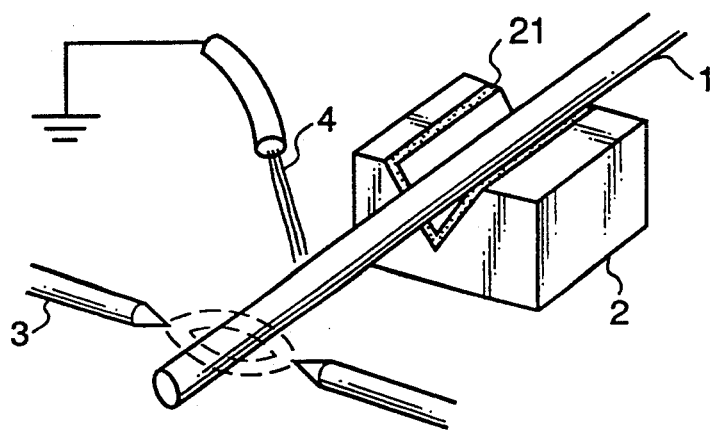
FIG. 4 shows a grounding test procedure conducted as Comparative Example.

As shown in FIG. 1, hermetic optical fibers each of which had a carbon layer of about 500 Å in thickness coated on an outer surface of a single mode optical fiber having a diameter of 125 μm were positioned on the electrically nonconductive V-shaped groove. Cores of the fibers were aligned and then the optical fibers were fused and connected. An average break strength was 1.4 kg. A connection loss was as shown in FIG. 2 and an average loss was 0.04 dB.

A comparison test was conducted. The hermetic optical fibers were positioned on the electrically nonconductive V-shaped groove. With contacting a grounded copper wire 4 with the hermetic optical fiber at the point between the electrode 3 and the pedestal 2, the discharge was conducted to fuse and connect the optical fibers. An average break strength of the connected part decreased to 0.6 kg.

According to the present invention, the connected part having a small break strength decrease after the connection can be obtained without passing a current in the optical fiber surface during the fusion and connection.

What is claimed is:

1. A method for connecting hermetic optical fibers having a hermetically sealed layer coated on optical fiber glass, which comprises the steps of:
    (a) positioning the optical fibers on respective electrically nonconductive V-shaped grooves of a pair of V-shaped grooves,
    (b) adjustably aligning cores of the optical fibers and fusing and connecting the optical fibers through an aerial discharge.

2. The method according to claim 1, wherein a material forming the electrically nonconductive V-shaped groove has a resistivity greater than $10^{+8}$ ohm·m.

3. The method according to claim 1, wherein the aerial discharge is conducted so that the fusion temperature is from 1600° to 2000° C.

* * * * *